Patented June 13, 1950

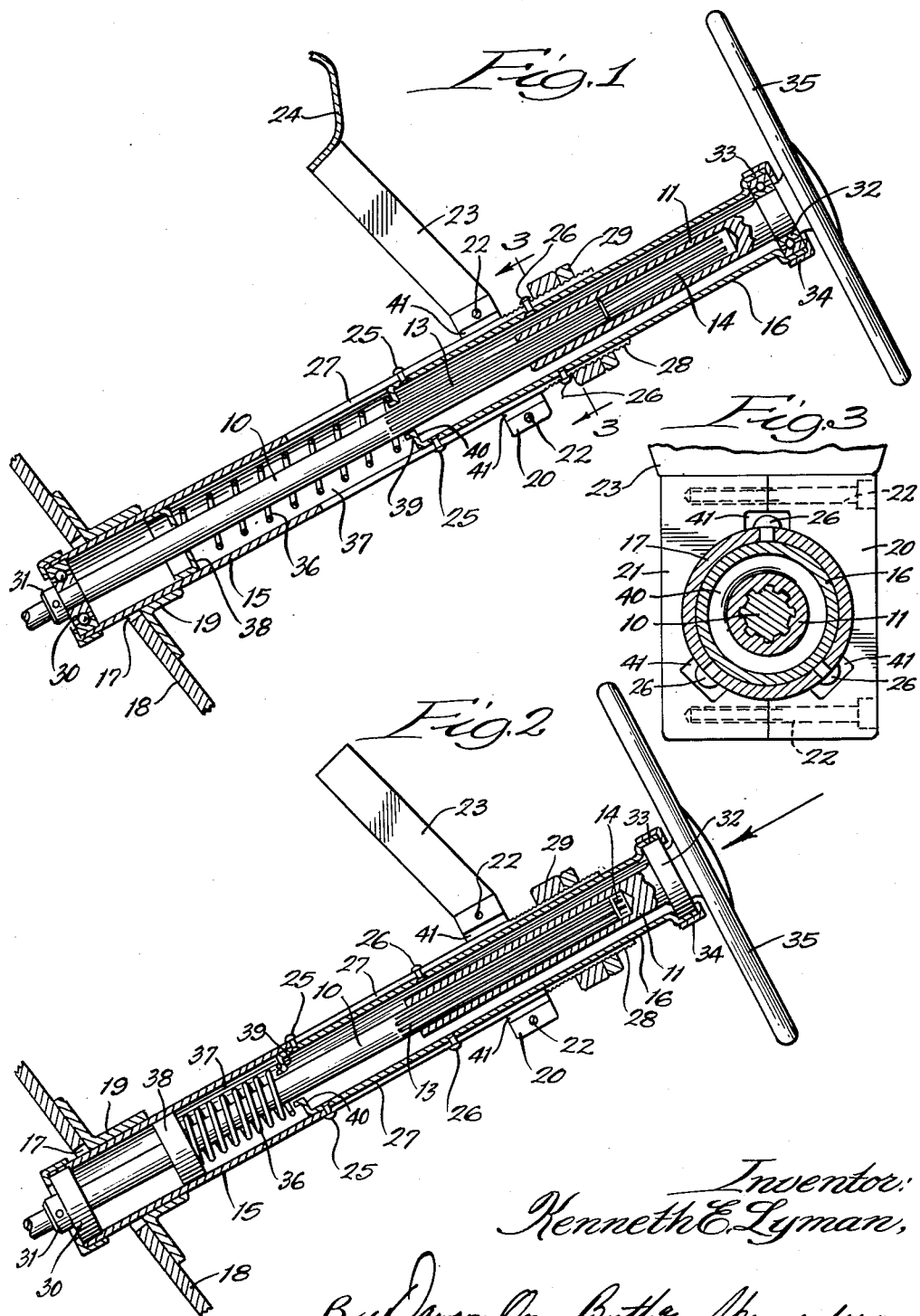

2,511,165

UNITED STATES PATENT OFFICE 2,511,165

COLLAPSIBLE VEHICLE STEERING COLUMN ASSEMBLY

Kenneth E. Lyman, Chicago, Ill., assignor to Tucker Corporation, Chicago, Ill., a corporation of Delaware Application December 5, 1947, Serial No. 789,900

9 Claims. (Cl. 74—493)

This invention relates to steering wheel assemblies for automotive vehicles, and it is an object of this invention to produce a collapsible wheel.

More particularly, it is an object to produce a steering wheel which is resiliently held in its normal operative position but which, responsive to the application of forces—intentionally or unintentionally applied, may be moved away from its normal operative position.

Another object is to produce a steering wheel, the normal operative position of which may be adjusted to correspond to the requirements of the operator.

A further object is to produce a steering wheel of the type described which is operatively connected for steering purposes in all positions of collapse and adjustment.

The many advantages of a collapsible steering wheel of the type described will be obvious to all who are acquainted with present-day conveyances. For instance, fewer injuries and deaths will result from inadvertent body engagement with the steering wheel caused by sudden impact, stoppage, or even decelleration of the vehicle. In these specific instances, the steering wheel will "give" in response to such body engagement and will operate additionally gradually to check the forward motion of the body.

Another advantage is that a large amount of space can readily be made available when the steering wheel is intentionally shifted to its collapsed position to permit ingress to and egress from the vehicle.

These and other objects and advantages of this invention will become apparent from the following description and for purposes of illustration, but not of limitation, an embodiment is shown in the accompanying drawing in which—

Figure 1 is a transverse sectional view of a steering mechanism embodying the features of this invention showing the steering wheel in its normal driving or operative position;

Figure 2 is a transverse sectional view of the steering wheel shown in Fig. 1 but with the parts in the collapsed position; and Figure 3 is a sectional view taken along the line 3—3 of Fig. 1.

A cardinal feature of this invention resides in the construction of a collapsible automotive steering wheel mechanism employing sectional steering wheel rods interconnected for rotational movement together but axially slidable one with respect to the other to dispose the steering wheel mounted thereon in a collapsed or a normally operative position of adjustment. The rod sections are tensionally held in the position to dispose the steering wheel in the normal operative position, which position may be predetermined by adjustment to conform to the requirements of the operator.

The steering mechanism, as shown, consists of a two-part steering rod 10 and 11 having telescoping end portions to enable relative axial sliding movement. The rod parts are interconnected for rotational movement together; for example, they are slidably splined on each other, as indicated at 13 and 14.

Concentric with the sectional steering rod is a housing in the form of a two-part tubular member 15 and 16. The lower end portion of part 15 extends through an opening 17 in the floorboard 18 of the vehicle and is stationarily positioned by means of a bracket 19 fixed to the floorboard 18. The upper end portion of part 15 is gripped between a pair of clamping jaws 20 and 21 held in gripping relation by set screws 22 and supported by a rigid strap 23 adapted to be fixed to the underside of the dashboard 24.

Part 16 telescopes in the upper open end of part 15 enabling relative axial sliding movement thereof. The extent of such relative movement is controlled by a pair of longitudinally spaced-apart stops, such as rivets 25 and 26, secured to the telescoping end portion of the part 16 and slidable in an elongate axially aligned slot 27 in the end portion of the part 15. The slot 27 extends from the upper end of the housing part through a major portion of its length, and more than one group of such slot and cooperating stops may be provided in uniform spaced relation about the housing parts.

The outer wall of the upper end portion of the part is threaded, as at 28, threadably to be engaged by a nut 29 which obstructs and thereby determines the upper limit to which the rivet 26 may move in the slot 27. By turning the nut in one direction or the other, that limit may be raised or lowered and, as will hereafter be explained, the normal operative position of the steering wheel is thereby adjusted.

A roller bearing 30 rotatably mounts the steering rod part 10 in the lower end portion of the housing part 15, and a lock nut 31 cooperates with the roller bearing to prevent relative longitudinal or axial movement between the corresponding rod and housing parts. Another roller bearing 32 rotatably mounts the other rod part 11 at its upper end in the respective upper end portion of the housing part, an enlarged sleeve section 33 on the end of the housing cooperating with a closing cup-shaped disc 34 and the bearing to provide for conjoint axial movement between the respective rod and housing parts. The steering wheel 35 fixed to the outer end of the rod 11 is carried therewith to the collapsed and normal operative positions of adjustment.

A coil spring 36 is disposed in the cylindrical free space 37 between the housing part 15 and the steering rod part 10, one end of the spring bearing against the cup-shaped closure 38 fixed to the inner wall of the housing 15 while the other end of the spring seats in an annular groove 39 formed by extruding the closing end wall 40 of the housing part 16 to provide a central opening through which the rod part 11 extends. The coil spring thus operates constantly to urge the housing part 16 and conjointly the rod part 11 and the steering wheel to their extended position of adjustment, or their normal operative position.

Describing briefly the operation of the mechanism, it will be evident that the coil spring 36 causes outward movement of the housing part 16 and its associated rod 11 and wheel 35 until the rivet 26 is stopped by the nut 29. This then is the relation wherein the steering wheel is disposed in its normal operative position, and, as previously pointed out, this position may be adjusted merely by turning the nut 29 in the appropriate direction.

When a force is applied to the steering wheel having a force vector normal to the steering wheel which is capable of compressing the coil spring 36, the wheel and its associated parts are shifted downwardly further tensioning the coil spring. During this axial downward movement, the rivets 25 and 27 move downwardly through the slot 27, slots 41 also being provided in the clamping jaws to permit such passage, until the rivet 25 is stopped at the lower end of the slot 27. This determines the collapsed position of the steering wheel.

In the event that the applied force results inadvertently from an accident, it is evident that the magnitude of the force or the inertia of the moving body will be slowly dissipated during such collapsing movements so that the ultimate impact and injury will be lessened or even entirely avoided. Upon the release of the force or forces, the tension coil spring is effective for returning and tensionally holding the parts in their operative position of adjustment. It will also be evident that through the splined connection the steering wheel is operatively connected for actuating the steering wheels during all stages of movement between the collapsed and operative positions.

While one embodiment of the invention has been shown and described in detail, it will be understood that it is illustrative only and is not intended to be definition of the scope of the invention, reference being had for this purpose to the appended claims.

What is claimed is:

1. An automotive steering wheel comprising a two-part steering rod interconnected for relative axial sliding movement and for rotational movement together, a steering wheel fixed to the outer end of said steering rod, a stop connected with one steering rod part, a pair of adjustably spaced abutments associated with the other steering rod part and between which the stop is freely movable to limit axial movement of the steering wheel between normally operative and collapsed positions of adjustment, means for constantly urging said rod parts to the former position of adjustment.

2. An automotive steering wheel comprising a telescoping two-part steering rod interconnected for rotational movement together, a steering wheel fixed to the outer end of said two-part steering rod, a stop connected with one steering rod part, a pair of adjustably spaced abutments associated with the other steering rod part and between which the stop is freely movable to limit axial movement of the steering wheel between collapsed and extended positions of adjustment, in the latter position of which the steering is in its normally operative position, means tensionally urging said telescoping rod parts toward the extended position of adjustment, and means for adjusting the spaced relation between abutments for determining the extent of axial movement of said rod parts.

3. An automotive steering mechanism comprising a two-part steering rod interconnected for relative axial sliding movement and for rotational movement together, a steering wheel fixed to the outer end of said steering rod, a two-part housing interconnected for relative axial sliding movement, operative connections between each of said rod parts and respective housing parts for causing conjoint axial movement and enabling relative rotational movement of said steering rod, a stop on one housing part, a pair of longitudinally spaced abutments on the other housing part for stopping relative axial movement of the housing parts upon engagement of the stop therewith to limit the extent of axial movement of said housing parts between collapsed and extended positions of adjustment, spring means operative between housing parts for constantly urging said housing parts toward the extended position, and means for adjusting the abutment which determines the extended position.

4. A steering wheel mechanism as claimed in claim 3 in which the two-part housing is tubular and concentric with the steering rod.

5. A steering wheel as claimed in claim 3 in which the two-part housing comprises telescoping tubular parts concentric with and surrounding the steering rod.

6. A steering mechanism as claimed in claim 3 in which the operative connection between each of said rod parts and respective housing parts comprises separate anti-friction bearings arranged in annular grooves in each of said respective members.

7. A steering mechanism as claimed in claim 3 in which the means for limiting the extent of relative axial movement between housing parts comprises axially aligned stops fixed to one and operative in an axially aligned slot in the other.

8. A steering wheel as claimed in claim 3 in which the means for limiting the extent of relative axial movement between housing parts comprises axially aligned stops fixed to one of said members and operative in axially aligned slots in the other, and the means cooperating with said limiting means for regulating the extended position includes means for varying the upper effective end point of said slot.

9. A steering wheel mechanism as claimed in claim 8 in which the means for varying the upper effective end point of said slot comprises a threaded end portion on the slotted housing part, and a nut which threadably engages said threaded end portion.

KENNETH E. LYMAN.

(References on following page)

REFERENCES CITED

The following references are of record in the file of this patent:

UNITED STATES PATENTS

| Number | Name | Date |
|---|---|---|
| 1,791,001 | Rasmussen | Feb. 3, 1931 |
| 2,007,152 | Allee | July 9, 1935 |
| 2,079,536 | Thurber | May 4, 1937 |
| 2,140,319 | Heppner et al. | Dec. 13, 1938 |
| 2,227,821 | Burrell | Jan. 7, 1941 |